US012709926B2

(12) United States Patent
Criddle

(10) Patent No.: US 12,709,926 B2
(45) Date of Patent: Aug. 18, 2026

(54) MULTI-POINT SLIDING DOOR LOCK

(71) Applicant: Amesbury Industries, Inc., Edina, MN (US)

(72) Inventor: Douglas John Criddle, Sioux Falls, SD (US)

(73) Assignee: Amesbury Industries, Inc., Edina, MN (US)

(*) Notice: Subject to any disclaimer, the term of this patent is extended or adjusted under 35 U.S.C. 154(b) by 53 days.

(21) Appl. No.: 18/792,902

(22) Filed: Aug. 2, 2024

(65) Prior Publication Data

US 2025/0043603 A1 Feb. 6, 2025

Related U.S. Application Data

(60) Provisional application No. 63/517,652, filed on Aug. 4, 2023.

(51) Int. Cl.
*E05B 63/06* (2006.01)
*E05B 63/00* (2006.01)
(Continued)

(52) U.S. Cl.
CPC ............ *E05C 9/02* (2013.01); *E05B 63/0056* (2013.01); *E05B 63/06* (2013.01); *E05B 65/0811* (2013.01)

(58) Field of Classification Search
CPC .... E05B 65/0858; E05B 63/06; Y10T 292/06; Y10T 292/0848; Y10T 292/0849;
(Continued)

(56) References Cited

U.S. PATENT DOCUMENTS 333,093 A 12/1885 Wright
419,384 A 1/1890 Towne
(Continued)

FOREIGN PATENT DOCUMENTS

AU 84928 12/1920
CA 2631521 11/2009
(Continued)

OTHER PUBLICATIONS

"Intercity Locks—For All Your Security Needs—Fast", http://www.directlocks.co.uk/locks-multipoint-locks-c-123_96.html, accessed Oct. 27, 2011, original publication date unknown, 3 pgs.
(Continued)

*Primary Examiner* — Carlos Lugo
(74) *Attorney, Agent, or Firm* — Merchant & Gould P.C.

(57) ABSTRACT

A multi-point sliding door lock includes a lock assembly and a cartridge assembly, the lock assembly is configured to receive the cartridge assembly in a plurality of different positions spaced along a longitudinal axis. The lock assembly includes a lock housing supporting a pair of latch elements configured to move between an extended position and a retracted position. A slide plate is disposed within the lock housing and engaged with the pair of latch elements such that sliding movement of the slide plate pivots each of the pair of latch elements. The cartridge assembly includes a cartridge housing insertable at least partially into the lock housing. A hub is rotatably mounted at least partially within the cartridge housing. The hub engages with the slide plate when the cartridge assembly is received by the lock assembly such that rotation of the hub drives the sliding movement of the slide plate.

19 Claims, 7 Drawing Sheets

(51) Int. Cl.
*E05B 65/08* (2006.01)
*E05C 9/02* (2006.01)

(58) Field of Classification Search
CPC ......... Y10T 292/0854; Y10T 292/0921; Y10S 292/46; Y10S 292/53; Y10S 292/54; Y10S 292/60
See application file for complete search history.

(56) References Cited

U.S. PATENT DOCUMENTS 651,947 A 6/1900 Johnson
738,280 A 9/1903 Bell et al.
932,330 A 8/1909 Rotchford
958,880 A 5/1910 Lawson
966,208 A 8/1910 Hoes
972,769 A 10/1910 Lark
980,131 A 12/1910 Shean
998,642 A 7/1911 Shean
1,075,914 A 10/1913 Hoes
1,094,143 A 4/1914 Hagstrom
1,142,463 A 6/1915 Shepherd
1,174,652 A 3/1916 Banks
1,247,052 A 11/1917 Wilson
1,251,467 A 1/1918 Blixt et al.
1,277,174 A 8/1918 Bakst
1,359,347 A 11/1920 Fleisher
1,366,909 A 2/1921 Frommer
1,368,141 A 2/1921 Hagstrom
1,529,085 A 3/1925 Preble
1,574,023 A 2/1926 Crompton et al.
1,596,992 A 8/1926 Ognowicz
1,646,674 A 10/1927 Angelillo
1,666,654 A 4/1928 Hiering
1,716,113 A 6/1929 Carlson
1,974,253 A 9/1934 Sandor
2,535,947 A 12/1950 Newell
2,729,089 A 1/1956 Pelcin
2,739,002 A 3/1956 Johnson
2,862,750 A 12/1958 Minke
2,887,336 A 5/1959 Meyer
2,905,493 A 9/1959 Tocchetto
3,064,462 A 11/1962 Ng et al.
3,083,560 A 4/1963 Scott
3,124,378 A 3/1964 Jackson
3,157,042 A 11/1964 Wolz
3,162,472 A 12/1964 Rust
3,214,947 A 11/1965 Wikkerink
3,250,100 A 5/1966 Cornaro
3,332,182 A 7/1967 Mark
3,378,290 A 4/1968 Sekulich
3,413,025 A 11/1968 Sperry
3,437,364 A 4/1969 Walters
RE26,677 E 10/1969 Russell et al.
3,498,657 A 3/1970 Fontana
3,578,368 A 5/1971 Dupuis
3,586,360 A 6/1971 Perrotta
3,617,080 A 11/1971 Miller
3,670,537 A 6/1972 Horgan, Jr.
3,792,884 A 2/1974 Tutikawa
3,806,171 A 4/1974 Fernandez
3,899,201 A 8/1975 Paioletti
3,904,229 A 9/1975 Waldo
3,919,808 A 11/1975 Simmons
3,933,382 A 1/1976 Counts
3,940,886 A 3/1976 Ellingson, Jr.
3,953,061 A 4/1976 Hansen et al.
4,050,272 A * 9/1977 Tanaka ................ E05B 65/0811 292/26
4,076,289 A 2/1978 Fellows et al.
4,116,479 A 9/1978 Poe
4,130,306 A 12/1978 Brkic
4,132,438 A 1/1979 Guymer
4,135,377 A 1/1979 Kleefeldt
4,146,994 A 4/1979 Williams
4,236,396 A 12/1980 Surko et al.
4,273,368 A 6/1981 Tanaka
4,283,882 A 8/1981 Hubbard
4,288,944 A 9/1981 Donovan
4,362,328 A 12/1982 Tacheny
4,365,490 A 12/1982 Manzoni
4,372,594 A 2/1983 Gater
4,476,700 A 10/1984 King
4,500,122 A 2/1985 Douglas
4,547,006 A 10/1985 Castanier
4,548,432 A 10/1985 Bengtsson
4,593,542 A 6/1986 Rotondi et al.
4,595,220 A 6/1986 Hatchett, Jr.
4,602,490 A 7/1986 Glass
4,602,812 A 7/1986 Bourne
4,607,510 A 8/1986 Shanaan et al.
4,633,688 A 1/1987 Beudat
4,639,025 A 1/1987 Fann
4,643,005 A 2/1987 Logas
4,691,543 A 9/1987 Watts
4,704,880 A 11/1987 Schlindwein
4,706,512 A 11/1987 McKernon et al.
4,717,909 A 1/1988 Davis
4,754,624 A 7/1988 Fleming et al.
4,768,817 A 9/1988 Fann
4,799,719 A 1/1989 Wood
4,893,849 A 1/1990 Schlack
4,913,475 A 4/1990 Bushnell et al.
4,949,563 A 8/1990 Gerard et al.
4,961,602 A 10/1990 Pettersson
4,962,653 A 10/1990 Kaup
4,962,800 A 10/1990 Owiriwo
4,964,660 A 10/1990 Prevot et al.
4,973,091 A 11/1990 Paulson
5,077,992 A 1/1992 Su
5,092,144 A 3/1992 Fleming et al.
5,114,192 A 5/1992 Toledo
5,118,151 A 6/1992 Nicholas, Jr. et al.
5,125,703 A 6/1992 Clancy et al.
5,148,691 A 9/1992 Wallden
5,171,050 A 12/1992 Mascotte
5,172,944 A 12/1992 Munich et al.
5,184,852 A 2/1993 O'Brien
5,193,861 A 3/1993 Juga
5,197,771 A 3/1993 Kaup et al.
5,257,841 A 11/1993 Geringer
5,265,452 A 11/1993 Dawson et al.
5,290,077 A 3/1994 Fleming
5,364,138 A 11/1994 Dietrich
5,373,716 A 12/1994 MacNeil et al.
5,382,060 A 1/1995 O'Toole et al.
5,388,875 A 2/1995 Fleming
5,394,718 A 3/1995 Hotzi
5,404,737 A 4/1995 Hotzl
5,441,315 A 8/1995 Kleefeldt
5,456,503 A 10/1995 Russell et al.
5,482,334 A 1/1996 Hotzl
5,495,731 A 3/1996 Riznik
5,496,082 A 3/1996 Zuckerman
5,498,038 A 3/1996 Simon
5,513,505 A 5/1996 Danes
5,516,160 A 5/1996 Kajuch
5,524,941 A 6/1996 Fleming
5,524,942 A 6/1996 Fleming
5,531,086 A 7/1996 Bryant
5,544,924 A 8/1996 Paster
5,546,777 A 8/1996 Liu
5,603,534 A 2/1997 Fuller
5,609,372 A 3/1997 Ponelle
5,620,216 A 4/1997 Fuller
5,628,216 A 5/1997 Qureshi
5,707,090 A 1/1998 Sedley
5,716,154 A 2/1998 Miller et al.
5,722,704 A 3/1998 Chaput et al.
5,728,108 A 3/1998 Griffiths et al.
5,735,559 A 4/1998 Frolov
5,757,269 A 5/1998 Roth
5,782,114 A 7/1998 Zeus et al.
5,791,179 A 8/1998 Brask

(56) References Cited

U.S. PATENT DOCUMENTS

| | | | |
|---|---|---|---|
| 5,791,700 | A | 8/1998 | Biro |
| 5,820,170 | A | 10/1998 | Clancy |
| 5,820,173 | A | 10/1998 | Fuller |
| 5,825,288 | A | 10/1998 | Wojdan |
| 5,865,479 | A | 2/1999 | Viney |
| 5,878,606 | A | 3/1999 | Chaput et al. |
| 5,890,753 | A | 4/1999 | Fuller |
| 5,896,763 | A | 4/1999 | Dinkelborg et al. |
| 5,901,989 | A | 5/1999 | Becken et al. |
| 5,906,403 | A | 5/1999 | Bestler et al. |
| 5,911,460 | A | 6/1999 | Hawkins |
| 5,911,763 | A | 6/1999 | Quesada |
| 5,915,764 | A | 6/1999 | MacDonald |
| 5,918,916 | A | 7/1999 | Kajuch |
| 5,931,430 | A | 8/1999 | Palmer |
| 5,946,956 | A | 9/1999 | Hotzl |
| 5,951,068 | A | 9/1999 | Strong et al. |
| 5,979,199 | A | 11/1999 | Elpern |
| 6,050,115 | A | 4/2000 | Schroter et al. |
| 6,079,585 | A | 6/2000 | Lentini |
| 6,089,058 | A | 7/2000 | Elpern |
| 6,094,869 | A | 8/2000 | Magoon et al. |
| 6,094,952 | A | 8/2000 | Clark |
| 6,098,433 | A | 8/2000 | Manaici |
| 6,112,563 | A | 9/2000 | Ramos |
| 6,116,067 | A | 9/2000 | Myers |
| 6,119,538 | A | 9/2000 | Chang |
| 6,120,071 | A | 9/2000 | Picard |
| D433,916 | S | 11/2000 | Frey |
| 6,145,353 | A | 11/2000 | Doucet |
| 6,147,622 | A | 11/2000 | Fonea |
| 6,148,650 | A | 11/2000 | Kibble |
| 6,174,004 | B1 | 1/2001 | Picard et al. |
| 6,196,599 | B1 | 3/2001 | D'Hooge |
| 6,209,931 | B1 | 4/2001 | Von Stoutenborough et al. |
| 6,217,087 | B1 | 4/2001 | Fuller |
| 6,250,842 | B1 | 6/2001 | Kruger |
| 6,257,030 | B1 | 7/2001 | Davis, III et al. |
| 6,264,252 | B1 | 7/2001 | Clancy |
| 6,266,981 | B1 | 7/2001 | von Resch et al. |
| 6,282,929 | B1 | 9/2001 | Eller et al. |
| 6,283,516 | B1 | 9/2001 | Viney |
| 6,293,598 | B1 | 9/2001 | Rusiana |
| 6,318,769 | B1 | 11/2001 | Kang |
| 6,327,881 | B1 | 12/2001 | Grundler et al. |
| 6,389,855 | B2 | 5/2002 | Renz et al. |
| 6,441,735 | B1 | 8/2002 | Marko |
| 6,443,506 | B1 | 9/2002 | Su |
| 6,453,616 | B1 | 9/2002 | Wright |
| 6,454,322 | B1 | 9/2002 | Su |
| 6,457,751 | B1 | 10/2002 | Hartman |
| 6,490,895 | B1 | 12/2002 | Weinerman |
| 6,502,435 | B2 | 1/2003 | Watts et al. |
| 6,516,641 | B1 | 2/2003 | Segawa |
| 6,517,127 | B1 | 2/2003 | Lu et al. |
| 6,540,268 | B2 | 4/2003 | Pauser |
| 6,564,596 | B2 | 5/2003 | Huang |
| 6,568,726 | B1 | 5/2003 | Caspi |
| 6,580,355 | B1 | 6/2003 | Milo |
| 6,619,085 | B1 | 9/2003 | Hsieh |
| 6,637,784 | B1 | 10/2003 | Hauber |
| 6,672,632 | B1 | 1/2004 | Speed et al. |
| 6,688,656 | B1 | 2/2004 | Becken |
| 6,725,693 | B2 | 4/2004 | Yu et al. |
| 6,733,051 | B1 | 5/2004 | Cowper |
| 6,776,441 | B2 | 8/2004 | Liu |
| 6,810,699 | B2 | 11/2004 | Nagy |
| 6,813,916 | B2 | 11/2004 | Chang |
| 6,871,451 | B2 | 3/2005 | Harger et al. |
| 6,905,152 | B1 | 6/2005 | Hudson |
| 6,929,293 | B2 | 8/2005 | Tonges |
| 6,935,662 | B1 | 8/2005 | Hauber et al. |
| 6,945,572 | B1 | 9/2005 | Hauber |
| 6,962,377 | B2 | 11/2005 | Tonges |
| 6,971,686 | B2 | 12/2005 | Becken |
| 6,994,383 | B2 | 2/2006 | Morris |
| 7,000,959 | B2 | 2/2006 | Sanders |
| 7,010,945 | B2 | 3/2006 | Yu |
| 7,010,947 | B2 | 3/2006 | Milo |
| 7,025,394 | B1 | 4/2006 | Hunt |
| 7,032,418 | B2 | 4/2006 | Martin |
| 7,052,054 | B2 | 5/2006 | Luker |
| 7,083,206 | B1 | 8/2006 | Johnson |
| 7,128,350 | B2 | 10/2006 | Eckerdt |
| 7,152,441 | B2 | 12/2006 | Friar |
| 7,155,946 | B2 | 1/2007 | Lee et al. |
| 7,203,445 | B2 | 4/2007 | Uchida |
| 7,207,199 | B2 | 4/2007 | Smith et al. |
| 7,249,791 | B2 | 7/2007 | Johnson |
| 7,261,330 | B1 | 8/2007 | Hauber |
| 7,353,637 | B2 | 4/2008 | Harger et al. |
| 7,354,081 | B2 * | 4/2008 | Kondratuk .............. E05B 55/00 70/144 |
| 7,404,306 | B2 | 7/2008 | Walls et al. |
| 7,410,194 | B2 | 8/2008 | Chen |
| 7,418,845 | B2 | 9/2008 | Timothy |
| 7,513,540 | B2 | 4/2009 | Hagemeyer et al. |
| 7,526,933 | B2 | 5/2009 | Meekma |
| 7,634,928 | B2 | 12/2009 | Hunt |
| 7,637,540 | B2 | 12/2009 | Chiang |
| 7,677,067 | B2 | 3/2010 | Riznik et al. |
| 7,686,207 | B1 | 3/2010 | Jeffs |
| 7,707,862 | B2 | 5/2010 | Walls et al. |
| 7,726,705 | B2 | 6/2010 | Kim |
| 7,735,882 | B2 | 6/2010 | Abdollahzadeh et al. |
| 7,748,759 | B2 | 7/2010 | Chen |
| 7,856,856 | B2 | 12/2010 | Shvartz |
| 7,871,112 | B2 * | 1/2011 | Kondratuk ............ E05B 63/042 292/137 |
| 7,878,034 | B2 | 2/2011 | Alber et al. |
| 7,946,080 | B2 | 5/2011 | Ellerton |
| 7,963,573 | B2 | 6/2011 | Blomqvist |
| 8,079,240 | B2 | 12/2011 | Brown et al. |
| 8,161,780 | B1 | 4/2012 | Huml |
| 8,182,002 | B2 | 5/2012 | Fleming |
| 8,325,039 | B2 | 12/2012 | Picard |
| 8,348,308 | B2 | 1/2013 | Hagemeyer et al. |
| 8,376,414 | B2 | 2/2013 | Nakanishi et al. |
| 8,376,415 | B2 | 2/2013 | Uyeda |
| 8,382,166 | B2 | 2/2013 | Hagemeyer et al. |
| 8,382,168 | B2 | 2/2013 | Carabalona |
| 8,398,126 | B2 | 3/2013 | Nakanishi et al. |
| 8,403,376 | B2 | 3/2013 | Greiner |
| 8,494,680 | B2 | 7/2013 | Sparenberg et al. |
| 8,550,506 | B2 | 10/2013 | Nakanishi |
| 8,567,631 | B2 | 10/2013 | Brunner |
| 8,628,126 | B2 | 1/2014 | Hagemeyer et al. |
| 8,646,816 | B2 | 2/2014 | Dziurdzia |
| 8,702,131 | B1 * | 4/2014 | Gianoli ................. E05B 63/044 292/DIG. 60 |
| 8,839,562 | B2 | 9/2014 | Madrid |
| 8,840,153 | B2 | 9/2014 | Juha |
| 8,850,744 | B2 | 10/2014 | Bauman et al. |
| 8,851,532 | B2 | 10/2014 | Gerninger |
| 8,876,172 | B2 | 11/2014 | Denison |
| 8,899,635 | B2 | 12/2014 | Nakanishi |
| 8,922,370 | B2 | 12/2014 | Picard |
| 8,939,474 | B2 | 1/2015 | Hagemeyer et al. |
| 9,057,210 | B2 | 6/2015 | Dumas et al. |
| 9,196,104 | B2 | 11/2015 | Dumas et al. |
| 9,218,696 | B2 | 12/2015 | Dumas et al. |
| 9,428,937 | B2 | 8/2016 | Tagtow et al. |
| 9,482,035 | B2 | 11/2016 | Wolf |
| 9,512,654 | B2 | 12/2016 | Armari et al. |
| 9,605,444 | B2 | 3/2017 | Rickenbaugh |
| 9,637,957 | B2 | 5/2017 | Hagemeyer et al. |
| 9,758,997 | B2 | 9/2017 | Hagemeyer et al. |
| 9,765,550 | B2 | 9/2017 | Hemmingsen et al. |
| 9,790,716 | B2 | 10/2017 | Hagemeyer et al. |
| 9,822,552 | B2 | 11/2017 | Eller et al. |
| 10,087,656 | B1 | 10/2018 | Cannella |
| 10,174,522 | B2 | 1/2019 | Denison |
| 10,240,366 | B2 | 3/2019 | Sotes Delgado |
| 10,246,914 | B2 | 4/2019 | Sieglaar |

(56) References Cited

U.S. PATENT DOCUMENTS

| | | | |
|---|---|---|---|
| 10,273,718 | B2 | 4/2019 | Cannella |
| 10,400,477 | B2 | 9/2019 | Moon |
| 10,487,544 | B2 | 11/2019 | Ainley |
| 10,662,675 | B2 | 5/2020 | Tagtow |
| 10,738,506 | B2 | 8/2020 | Holmes |
| 10,808,424 | B2 | 10/2020 | Criddle |
| 10,822,836 | B2 | 11/2020 | Nakasone |
| 10,968,661 | B2 | 4/2021 | Tagtow |
| 11,021,892 | B2 | 6/2021 | Tagtow |
| 11,066,850 | B2 | 7/2021 | Welbig |
| 11,441,333 | B2 | 9/2022 | Tagtow |
| 11,634,931 | B2 | 4/2023 | Tagtow |
| 11,661,771 | B2 | 5/2023 | Lammers |
| 11,834,866 | B2 | 12/2023 | Lammers |
| 2002/0104339 | A1 | 8/2002 | Saner |
| 2003/0024288 | A1 | 2/2003 | Gokcebay et al. |
| 2003/0159478 | A1 | 8/2003 | Nagy |
| 2004/0003633 | A1 | 1/2004 | Alexander |
| 2004/0004360 | A1 | 1/2004 | Huang |
| 2004/0011094 | A1 | 1/2004 | Hsieh |
| 2004/0066046 | A1 | 4/2004 | Becken |
| 2004/0089037 | A1 | 5/2004 | Chang |
| 2004/0107746 | A1 | 6/2004 | Chang |
| 2004/0107747 | A1 | 6/2004 | Chang |
| 2004/0112100 | A1 | 6/2004 | Martin |
| 2004/0145189 | A1 | 7/2004 | Liu |
| 2004/0227349 | A1 | 11/2004 | Denys |
| 2004/0239121 | A1 | 12/2004 | Morris |
| 2005/0029345 | A1 | 2/2005 | Waterhouse |
| 2005/0044908 | A1 | 3/2005 | Min |
| 2005/0050928 | A1 | 3/2005 | Frolov |
| 2005/0103066 | A1 | 5/2005 | Botha et al. |
| 2005/0144848 | A1 | 7/2005 | Harger et al. |
| 2005/0166647 | A1 | 8/2005 | Walls |
| 2005/0180562 | A1 | 8/2005 | Chiang |
| 2005/0229657 | A1 | 10/2005 | Johansson et al. |
| 2006/0043742 | A1 | 3/2006 | Huang |
| 2006/0071478 | A1 | 4/2006 | Denys |
| 2006/0076783 | A1 | 4/2006 | Tsai |
| 2006/0150516 | A1 | 7/2006 | Hagemeyer |
| 2006/0208509 | A1 | 9/2006 | Bodily |
| 2007/0068205 | A1 | 3/2007 | Timothy |
| 2007/0080541 | A1 | 4/2007 | Fleming |
| 2007/0113603 | A1 | 5/2007 | Polster |
| 2007/0170725 | A1 | 7/2007 | Speyer et al. |
| 2007/0259551 | A1 | 11/2007 | Rebel |
| 2008/0000276 | A1 | 1/2008 | Huang |
| 2008/0001413 | A1 | 1/2008 | Lake |
| 2008/0087052 | A1 | 4/2008 | Abdollahzadeh et al. |
| 2008/0092606 | A1 | 4/2008 | Meekma |
| 2008/0093110 | A1 | 4/2008 | Bagung |
| 2008/0141740 | A1 | 6/2008 | Shvartz |
| 2008/0150300 | A1 | 6/2008 | Harger et al. |
| 2008/0156048 | A1 | 7/2008 | Topfer |
| 2008/0156049 | A1 | 7/2008 | Topfer |
| 2008/0157544 | A1 | 7/2008 | Phipps |
| 2008/0178530 | A1 | 7/2008 | Ellerton et al. |
| 2008/0179893 | A1 | 7/2008 | Johnson |
| 2008/0184749 | A1 | 8/2008 | Alber et al. |
| 2008/0191499 | A1 | 8/2008 | Stein |
| 2009/0064737 | A1 | 3/2009 | Fan |
| 2009/0078011 | A1 | 3/2009 | Avni |
| 2009/0218832 | A1 | 9/2009 | Mackle |
| 2009/0314042 | A1 | 12/2009 | Fan |
| 2009/0315669 | A1 | 12/2009 | Lang |
| 2010/0107707 | A1 | 5/2010 | Viviano |
| 2010/0154490 | A1 | 6/2010 | Hagemeyer et al. |
| 2010/0213724 | A1 | 8/2010 | Uyeda |
| 2010/0236302 | A1 | 9/2010 | Uyeda |
| 2010/0313612 | A1 | 12/2010 | Eichenstein |
| 2010/0327610 | A1 | 12/2010 | Nakanishi et al. |
| 2011/0056254 | A1 | 3/2011 | Tsai |
| 2011/0198867 | A1 | 8/2011 | Hagemeyer et al. |
| 2011/0289987 | A1 | 12/2011 | Chiou et al. |
| 2011/0314877 | A1 | 12/2011 | Fang |
| 2012/0001443 | A1 | 1/2012 | Mitchell |
| 2012/0146346 | A1 | 6/2012 | Hagemeyer et al. |
| 2012/0235428 | A1 | 9/2012 | Blacklaws et al. |
| 2012/0306220 | A1 | 12/2012 | Hagemeyer et al. |
| 2013/0019643 | A1 | 1/2013 | Tagtow et al. |
| 2013/0081251 | A1 | 4/2013 | Hultberg |
| 2013/0140833 | A1 | 6/2013 | Hagemeyer et al. |
| 2013/0152647 | A1 | 6/2013 | Terei et al. |
| 2013/0167671 | A1 | 7/2013 | Huang |
| 2013/0176107 | A1 | 7/2013 | Dumas et al. |
| 2013/0200636 | A1 | 8/2013 | Hagemeyer et al. |
| 2013/0234449 | A1 | 9/2013 | Dery et al. |
| 2013/0276488 | A1 | 10/2013 | Haber |
| 2014/0060127 | A1 | 3/2014 | Hemmingsen et al. |
| 2014/0125068 | A1 | 5/2014 | Hagemeyer et al. |
| 2014/0159387 | A1 | 6/2014 | Hagemeyer et al. |
| 2014/0182343 | A1 | 7/2014 | Talpe |
| 2014/0367978 | A1 | 12/2014 | Geringer |
| 2015/0075233 | A1 | 3/2015 | Pluta |
| 2015/0089804 | A1 | 4/2015 | Picard |
| 2015/0114176 | A1 | 4/2015 | Bisang |
| 2015/0170449 | A1 | 6/2015 | Chandler, Jr. |
| 2015/0176311 | A1 | 6/2015 | Picard |
| 2015/0252595 | A1 | 9/2015 | Hagemeyer et al. |
| 2016/0083976 | A1 | 3/2016 | Rickenbaugh |
| 2016/0094103 | A1 | 3/2016 | Lien |
| 2016/0108650 | A1 | 4/2016 | Hagemeyer et al. |
| 2016/0369525 | A1 | 12/2016 | Tagtow et al. |
| 2018/0023320 | A1 | 1/2018 | McKibben |
| 2018/0051478 | A1 | 2/2018 | Tagtow |
| 2018/0051480 | A1 | 2/2018 | Tagtow |
| 2018/0119462 | A1 | 5/2018 | Hagemeyer |
| 2018/0155962 | A1 | 6/2018 | Mitchell et al. |
| 2018/0298642 | A1 | 10/2018 | Tagtow |
| 2018/0313116 | A1 | 11/2018 | Criddle |
| 2019/0024437 | A1 | 1/2019 | Tagtow |
| 2019/0032368 | A1 | 1/2019 | Welbig et al. |
| 2019/0277062 | A1 | 9/2019 | Tagtow |
| 2020/0141155 | A1 | 5/2020 | Lammers |
| 2020/0149327 | A1 | 5/2020 | Lammers |
| 2020/0354990 | A1 | 11/2020 | Tagtow |
| 2020/0370338 | A1 | 11/2020 | Holmes |
| 2025/0341122 | A1 | 11/2025 | Criddle |
| 2025/0369267 | A1 | 12/2025 | Rickenbaugh |

FOREIGN PATENT DOCUMENTS

| | | | | |
|---|---|---|---|---|
| CN | 1243908 | | | 2/2000 |
| CN | 2554288 | Y | | 6/2003 |
| CN | 2595957 | Y | | 12/2003 |
| CN | 2660061 | | | 12/2004 |
| CN | 201031548 | Y | | 3/2008 |
| CN | 202047652 | U | | 11/2011 |
| CN | 108193950 | | | 6/2018 |
| DE | 410964 | C | * | 3/1925 |
| DE | 1002656 | | | 2/1957 |
| DE | 942555 | C | * | 5/1959 |
| DE | 1584112 | | | 9/1969 |
| DE | 2639065 | | | 3/1977 |
| DE | 3032086 | | | 3/1982 |
| DE | 3836693 | | | 5/1990 |
| DE | 9011216 | | | 10/1990 |
| DE | 4224909 | | | 2/1993 |
| DE | 29807860 | | | 8/1998 |
| DE | 20115378 | U1 | | 11/2001 |
| DE | 10253240 | | | 5/2004 |
| DE | 202012002743 | U1 | | 4/2012 |
| DE | 202013000920 | U1 | | 4/2013 |
| DE | 202013000921 | U1 | | 4/2013 |
| DE | 202013001328 | U1 | | 5/2013 |
| EP | 0007397 | A1 | | 2/1980 |
| EP | 0231042 | A2 | | 8/1987 |
| EP | 0268750 | | | 6/1988 |
| EP | 341173 | | | 11/1989 |
| EP | 359284 | | | 3/1990 |
| EP | 661409 | | | 7/1995 |
| EP | 792987 | | | 9/1997 |
| EP | 1106761 | | | 6/2001 |
| EP | 1283318 | | | 2/2003 |

(56) References Cited

FOREIGN PATENT DOCUMENTS

| | | | | | |
|---|---|---|---|---|---|
| EP | 1449994 | | | 8/2004 | |
| EP | 1574642 | | | 9/2005 | |
| EP | 186717 | | | 12/2007 | |
| EP | 2128362 | | | 12/2009 | |
| EP | 2273046 | A2 | | 1/2011 | |
| EP | 2339099 | A1 | | 6/2011 | |
| EP | 2450509 | | | 5/2012 | |
| EP | 2548123 | A1 | | 4/2013 | |
| EP | 2581531 | A1 | | 4/2013 | |
| EP | 2584124 | A2 | | 4/2013 | |
| EP | 2845971 | A1 | * | 3/2015 | E05B 9/08 |
| EP | 2998483 | | | 3/2016 | |
| EP | 3091152 | A1 | | 11/2016 | |
| FR | 363424 | | | 7/1906 | |
| FR | 370890 | | | 2/1907 | |
| FR | 21883 | E | | 4/1921 | |
| FR | 703827 | A | * | 5/1931 | |
| FR | 1142316 | | | 7/1957 | |
| FR | 1162406 | A | | 9/1958 | |
| FR | 1201087 | | | 12/1959 | |
| FR | 2339723 | | | 8/1977 | |
| FR | 2342390 | | | 9/1977 | |
| FR | 2344695 | | | 10/1977 | |
| FR | 2502673 | | | 10/1982 | |
| FR | 2753225 | A1 | * | 3/1998 | E05B 63/06 |
| FR | 2848593 | | | 2/2005 | |
| FR | 3017641 | | | 8/2015 | |
| FR | 3096387 | A1 | * | 11/2020 | E05B 63/06 |
| GB | 226170 | | | 4/1925 | |
| GB | 264373 | A | | 1/1927 | |
| GB | 583655 | | | 12/1946 | |
| GB | 612094 | A | | 11/1948 | |
| GB | 1498849 | | | 1/1978 | |
| GB | 1575900 | | | 1/1980 | |
| GB | 2051214 | | | 1/1981 | |
| GB | 2076879 | | | 12/1981 | |
| GB | 2115055 | A | | 9/1983 | |
| GB | 2122244 | | | 1/1984 | |
| GB | 2126644 | | | 3/1984 | |
| GB | 2136045 | | | 9/1984 | |
| GB | 2168747 | | | 6/1986 | |
| GB | 2196375 | | | 4/1988 | |
| GB | 2212849 | | | 8/1989 | |
| GB | 2225052 | | | 5/1990 | |
| GB | 2230294 | | | 10/1990 | |
| GB | 2242702 | | | 10/1991 | |
| GB | 2244512 | | | 12/1991 | |
| GB | 2265935 | | | 10/1993 | |
| GB | 2270343 | | | 3/1994 | |
| GB | 2134170 | | | 8/1994 | |
| GB | 2280474 | | | 2/1995 | |
| GB | 2318382 | A | | 4/1998 | |
| GB | 2364545 | | | 1/2002 | |
| GB | 2496911 | A | | 5/2013 | |
| IT | 614960 | | | 1/1961 | |
| JO | 2003343141 | | | 12/2003 | |
| JP | 64-083777 | | | 3/1989 | |
| JP | 2006112042 | | | 4/2006 | |
| JP | 2008002203 | | | 1/2008 | |
| KR | 2011094706 | | | 8/2011 | |
| NL | 8105627 | | | 7/1983 | |
| SE | 309372 | | | 3/1969 | |
| WO | 96/25576 | | | 8/1996 | |
| WO | 97/41323 | | | 11/1997 | |
| WO | 02/33202 | | | 4/2002 | |
| WO | 2007/104499 | | | 9/2007 | |
| WO | 2009/059112 | | | 5/2009 | |
| WO | 2010071886 | | | 6/2010 | |
| WO | WO-2013114409 | A1 | * | 8/2013 | E05B 9/02 |
| WO | 2015/079290 | | | 6/2015 | |
| WO | 2020/023652 | | | 1/2020 | |

OTHER PUBLICATIONS

"Intercity Locks—For All Your Security Needs—Fast", http://www.directlocks.co.uk/locks-multipoint-locks-c-123_96.html?page=2&sort=2A, accessed Oct. 27, 2011, original publication date unknown, 3 pgs.

"Intercity Locks—For All Your Security Needs—Fast", http://www.directlocks.co.uk/locks-multipoint-locks-c-123_96.html?page=3&sort=2A, accessed Oct. 27, 2011, original publication date unknown, 3 pgs.

"LocksOnline.co.uk: Premier Supplier of Security Products", http://www.locksonline.co.uk/acatalog/Maco_multipoint_lock_2_cams_2_shootbolt_attachment.html, accessed Oct. 27, 2011, original publication date unknown, 5 pgs.

"LocksOnline.co.uk: Premier Supplier of Security Products", http://www.locksonline.co.uk/acatalog/upvc_Locks.html, accessed Oct. 27, 2011, original publication date unknown, 6 pgs.

"UPVC Window Hardware and uPVC Door Hardware online", http://www.upvc-hardware.co.uk/, accessed Oct. 27, 2011, original publication date unknown, 2 pgs.

Doorking.com—Electric Locks—Strikes and Deadbolts; printed from https://www.doorking.com/access-control/electricocks-strikes-deadbolts, 2 pages, Feb. 2016.

magneticlocks.net—Electric Strikes and Deadbolts; printed from https://www.magneticlocks.net/electric-strikes-and-deadbolts/electric-strikes.html, 8 pages, Feb. 2016.

sdcsecurity.com—Latch and Deadbolt Monitoring Strikes; printed from http://www.sdcsecurity.com/monitor-strike-kits2.htm, 2 pages, Feb. 2016.

* cited by examiner

MULTI-POINT SLIDING DOOR LOCK

CROSS-REFERENCE TO RELATED APPLICATIONS

This application claims priority to and the benefit of U.S. Provisional Patent Application No. 63/517,652, filed Aug. 4, 2023, the disclosure of which is incorporated by reference in its entirety herein.

INTRODUCTION

Sliding patio door locks are typically mortised in a lock face of a stile of a sliding door and have either a single or a double hook or other latching element that engages with a corresponding keeper structure on the associated door jamb. These known sliding door locks, however, do not accommodate different backset distances of the lock without the use of customized trim plates, are difficult to attach additional latching elements or assemblies, and are difficult to use with recessed handles. Accordingly, improvements to sliding patio door locks are desired.

SUMMARY

In an aspect, the technology relates to a multi-point sliding door lock including: a lock assembly including: a lock housing elongated along a longitudinal axis, the lock housing having a locking face and a rear face, the locking face and the rear face opposite one another relative to a transverse axis that is orthogonal to the longitudinal axis; a pair of latch elements pivotally coupled to the lock housing, each of the pair of latch elements configured to move between an extended position relative to the locking face and a retracted position; and a slide plate disposed within the lock housing and slidable along the longitudinal axis, the slide plate engaged with the pair of latch elements such that sliding movement of the slide plate moves each of the pair of latch elements between the extended position and the retracted position; and a cartridge assembly including: a cartridge housing insertable at least partially into the lock housing from the rear face in a direction parallel to the transverse axis, the lock assembly configured to receive the cartridge assembly in a plurality of different positions spaced along the longitudinal axis; and a hub rotatably mounted at least partially within the cartridge housing and defining an opening configured to receive a torque blade, wherein the hub engages with the slide plate when the cartridge assembly is received by the lock assembly such that rotation of the hub drives the sliding movement of the slide plate.

In an example, the slide plate defines a plurality of hub mounts spaced along the longitudinal axis and facing towards the rear face of the lock housing, each of the plurality of hub mounts configured to engage with the hub of the cartridge assembly. In another example, the plurality of hub mounts are transverse grooves defined by the slide plate and parallel to the transverse axis. In yet another example, the transverse grooves are at least partially defined by a pair of fins extending from the slide plate. In still another example, the hub includes at least one arm, the at least one arm and the cartridge housing supporting a pin, and the pin is configured to engage at least partially within the respective transverse groove of the slide plate. In an example, the cartridge housing defines at least one L-shaped channel that at least partially slidingly receives the pin, the at least one L-shaped channel defining a locked position for the pin.

In another example, the slide plate further includes one or more couplers for attaching a remote lock. In yet another example, at each of the plurality of different positions that the cartridge housing is received by the lock housing, the opening of the hub is selectively positionable along the transverse axis between at least two different backset positions relative to the locking face of the lock housing. In still another example, at each of the plurality of different positions that the cartridge housing is received by the lock housing, the lock housing includes at least one transverse rib adapted to engage with at least a portion of the cartridge housing. In an example, the cartridge housing defines at least one gap bevel configured to slidingly engage the at least one transverse rib.

In another aspect, the technology relates to a multi-point sliding door lock including: a lock assembly including: a lock housing elongated along a longitudinal axis, the lock housing having a locking face and a rear face, the locking face and the rear face opposite one another relative to a transverse axis that is orthogonal to the longitudinal axis; a pair of latch elements pivotally coupled to the lock housing, each of the pair of latch elements configured to move between an extended position relative to the locking face and a retracted position; and a slide plate disposed within the lock housing and slidable along the longitudinal axis, the slide plate engaged with the pair of latch elements such that sliding movement of the slide plate moves each of the pair of latch elements between the extended position and the retracted position, wherein the slide plate includes a plurality of transverse grooves spaced along the longitudinal axis and open relative to the rear face; and a cartridge assembly including: a cartridge housing insertable at least partially into the lock housing from the rear face in a direction parallel to the transverse axis, the lock assembly configured to receive the cartridge assembly in a plurality of different positions corresponding to the plurality of transverse grooves; a hub rotatably mounted at least partially within the cartridge housing and defining an opening configured to receive a torque blade, the hub includes at least one radially extending arm; and a pin supported by the at least one radially extending arm and the cartridge housing, wherein the pin engages with one of the plurality of transverse grooves when the cartridge assembly is received by the lock assembly such that rotation of the hub drives the sliding movement of the slide plate.

In an example, the rear face of the lock housing includes a plurality of cartridge mounts spaced along the longitudinal axis, each of the plurality of cartridge mounts configured to engage with the cartridge housing of the cartridge assembly. In another example, each of the plurality of cartridge mounts includes a notch extending from the rear face, the notch configured to at least partially receive the hub of the cartridge assembly. In yet another example, at each of the plurality of cartridge mounts that the cartridge housing is received by the lock housing, the opening of the hub is selectively positionable along the transvers axis between at least two different backset positions relative to the locking face of the lock housing, and in a first backset position, the opening of the hub is at least partially received within the notch, and in a different second backset position, the opening of the hub is outside of the notch. In still another example, the notch is bounded on each longitudinal side by a transverse rib. In an example, the cartridge housing defines at least one L-shaped channel that at least partially slidingly receives the pin, the at least one L-shaped channel defining a locked position for the pin.

In another example, the slide plate further includes one or more couplers for attaching a remote lock. In yet another example, the slide plate defines a longitudinal slit, the longitudinal slit at least partially surrounding a pivot point of one of the pair of latch elements. In still another example, each of the pair of latch elements have a different outer perimeter profile shape.

In another aspect, the technology relates to a method of installing a multi-point sliding door lock including: providing the multi-point sliding door lock that includes a lock assembly with a lock housing elongated along a longitudinal axis, the lock housing having a locking face and a rear face, the locking face and the rear face opposite one another relative to a transverse axis that is orthogonal to the longitudinal axis, a pair of latch elements pivotally coupled to the lock housing, each of the pair of latch elements configured to move between an extended position relative to the locking face and a retracted position, and a slide plate disposed within the lock housing and slidable along the longitudinal axis, the slide plate engaged with the pair of latch elements such that sliding movement of the slide plate moves each of the pair of latch elements between the extended position and the retracted position, the multi-point sliding door lock also includes a cartridge assembly with a cartridge housing and a hub rotatably mounted at least partially within the cartridge housing and defining an opening configured to receive a torque blade, wherein the hub engages with the slide plate when the cartridge assembly is received by the lock assembly such that rotation of the hub drives the sliding movement of the slide plate; inserting the cartridge housing at least partially into the lock housing at one of a plurality of different positions spaced along the longitudinal axis, wherein the cartridge housing is inserted from the rear face of the lock housing and in a direction parallel to the transverse axis; setting a backset distance of the opening of the hub relative to the locking face of the lock housing by selectively positioning the cartridge housing along the transverse axis and relative to the lock housing; and mounting the lock assembly with the cartridge assembly attached thereto to a sliding door.

BRIEF DESCRIPTION OF DRAWINGS

There are shown in the drawings, examples that are presently preferred, it being understood, however, that the technology is not limited to the precise arrangements and instrumentalities shown.

DETAILED DESCRIPTION

Figure 1:
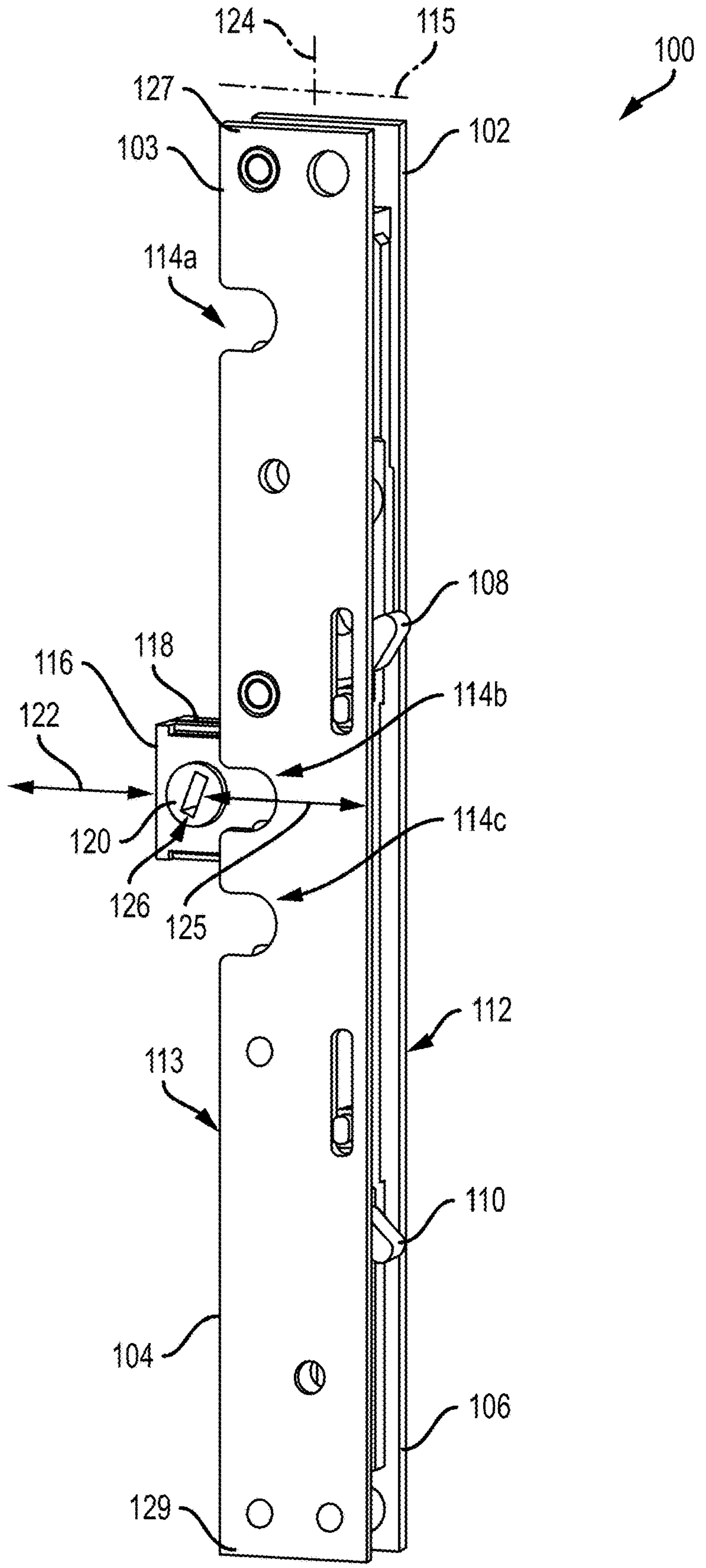
FIG. 1 is a perspective view of an exemplary multi-point sliding door lock.

In the examples described below, a multi-point sliding door lock is provided. The multi-point sliding door lock includes a lock assembly and a cartridge assembly. The lock assembly includes at least two locking elements that can be selectively extended and retracted from a lock housing. A slide plate is disposed within the lock housing and sliding movement of the slide plate within the lock housing drives the extension and retraction of the locking elements. The cartridge assembly may be inserted into a rear face of the lock housing so as to engage with the slide plate. The cartridge assembly carries a hub that is configured to engage with a door handle assembly via a key tail (e.g., torque blade) for driving rotation of the hub and thereby the sliding movement of the slide plate. The lock assembly defines a plurality of receiving positions for the cartridge assembly. As such, the multi-point sliding door lock facilitates operation with door handle assemblies with a wide range of thumb turn/key cylinder (e.g., actuator) positions and more than merely left- or right-handed door handle assembly positions. For example, the door handle assembly may have a centered thumb turn/key cylinder position, an offset thumb turn/key cylinder position (the centered and offset positions generally correspond to left or right handed handle positions), a high thumb turn/key cylinder position, or a low thumb turn/key cylinder position (the high and low positions may facilitate compatibility with recessed handle configurations that are disposed above or below the door lock). Additionally, the cartridge assembly may be secured to the lock housing such that the hub is positionable at two or more backset positions relative to the rear face of the lock housing. As such, the thumb turn/key cylinder position on the door handle assembly can have varying backset distances relative to a locking face of the sliding door.

U.S. Pat. No. 5,820,170 describes one example of a multi-point sliding door lock and is incorporated herein by reference in its entirety. In this example, the multi-point sliding door lock has a pair of hubs that are ganged together so that a door handle assembly having a centrally mounted thumb turn/key cylinder or a door handle assembly having an offset thumb turn/key cylinder arrangement (e.g., left- or right-handed handle operation) can be used for actuation. The hubs, however, are both set to the same backset distance, and as such, the thumb turn/key cylinder for both the central mount and offset mount must be positioned at a similar backset distance on the door handle assembly thereby limiting aesthetic options. Additionally, the hubs are centrally located within the multi-point sliding door lock, so the door handle assembly is mounted directly over the lock housing. In some situations, a door handle assembly that is mounted substantially above or below the lock housing on the door may be desired or required. This mounting location facilitates a recessed handle configuration that cannot be formed if the door lock is substantially directly under the handle assembly. Accordingly, improvements to existing multi-point sliding door locks are needed.

FIG. 1 is a perspective view of an exemplary multi-point sliding door lock 100. The multi-point sliding door lock 100 includes a lock assembly 102 configured to be mortised into a lock face of a stile of a sliding door (not shown). The lock assembly 102 includes a lock housing 103 with a first plate 104 and a second plate 106 parallel to each other and elongated along a longitudinal axis 124. A first latch element 108 (e.g., a hook) and a second latch element 110 (e.g., a hook) are pivotably mounted between the first and second plates 104, 106. The first and second latch elements 108, 110 are configured to selectively extend and retract relative to a locking face 112 of the lock assembly 102. FIG. 1 illustrates a retracted position of the latch elements 108, 110. In the retracted position, a portion (e.g., a nose) of one or more of the latch elements 108, 110 may extend from the lock housing 103. In other examples, the latch elements 108, 110 may fully retract within the lock housing 103 when in the retracted portion. In the extended position, the first and second latch elements 108, 110 project from the locking face 112 of the lock housing 103 and are configured to engage with a keeper (not shown) mounted on a door jamb.

In the example, a multi-point lock is described. It is appreciated that, the lock may include more than two latch elements as required or desired. Additionally, in other embodiments, the lock may include only a single latch element and the lock is a single point lock. Even with a single point lock, multiple actuation positions for the single point lock is facilitated with the structure described herein. The latch elements may be a hook as shown or any other latch type as required or desired Opposite from the locking face 112 the lock housing 103 has a rear face 113. The locking face 112 and the rear face 113 are opposite one another along relative to a transverse axis 115. The transverse axis 115 is orthogonal to the longitudinal axis 124. At the rear face 113, the first and second plates 104, 106 define a plurality of notches 114. The notches 114 at least partially define cartridge mounts of the lock assembly 102 and are configured to selectively receive a cartridge assembly 116 from the rear face 113. The cartridge assembly 116 includes a cartridge housing 118 and a hub 120 rotatably mounted therein. The cartridge assembly 116 is slidably received by the lock assembly 102 in a direction 122 that is substantially parallel to the transverse axis 115 and orthogonal to the longitudinal axis 124 of the lock housing 103. The cartridge assembly 116 operationally engages the lock assembly 102 so that upon rotation of the hub 120, the first and second latch elements 108, 110 extend and retract.

By using the cartridge assembly 116 to position hub 120 at the lock assembly 102, the hub 120 is positionable at two or more backset positions along direction 122. The backset position is the distance from the edge of the door to the torque blade position of the actuator of the door handle (e.g., a key cylinder, thumb turn, or the like). In the example, the backset distance 125 may be defined between the locking face 112 of the lock housing 103 and the centerline of a torque blade opening 126. The backset distance 125 is parallel to the transverse axis 115. The hub 120 includes the opening 126 that receives the torque blade and the opening 126 is positionable at two or more positions along direction 122. In an example, the position along direction 122 may be infinitely adjustable between a minimum and a maximum backset distance defined by the structure of the cartridge assembly 116 and the lock assembly 102 coupling together and as described herein. This configuration enables the multi-point sliding door lock 100 to accommodate a wide variety of door handles and with different actuator positions.

Additionally, the cartridge assembly 116 can be inserted at any one of the plurality of cartridge mounts defined by the lock assembly 102 and spaced along the longitudinal axis 124. This configuration enables the multi-point sliding door lock 100 to accommodate a wide variety of door handles. For example, notch **114*a* may be disposed proximate a first end 127 of the first and second plates 104, 106. By placing the cartridge assembly 116 at the first end 127 of the lock assembly 102, the cartridge assembly 116 can be coupled to a recessed handle assembly (not shown) that is mounted at the first end 127 of the lock assembly 102. Because the handle assembly is recessed, the lock assembly 102 cannot be substantially directly on top of the first or second plate 104, 106. In other examples, additionally, or alternatively, a notch (not shown) may be formed at a second end 129 of the lock assembly 102 and so that the handle assembly is disposed below the lock assembly 102. The first end 127 and the second end 129 of the lock assembly 102 are disposed along the longitudinal axis 124. The notches 114 are shaped and sized to at least partially receive the hub 120 of the cartridge assembly 116 and to facilitate a thinner profile of the multi-point sliding door lock 100**.

The center notches **114*b*, 114*c* enable the cartridge assembly 116 to couple to a handle assembly that is mounted on top of the first or second plate 104, 106 and on the door stile. Each notch 114*b*, 114*c* allows for the lock assembly 102 to be used on left- or right-handed handles on the sliding doors and without requiring any adjustment of the multi-point sliding door lock 100 other than the position of the cartridge assembly 116. In the example, the lock assembly 102 defines three different cartridge mounts for receiving the cartridge assembly 116. It is appreciated that more than three different cartridge mounts may be included as required or desired. Additionally, only a single cartridge assembly 116 needs to be used for operation of the multi-point sliding door lock 100. As such, manufacturing efficiencies are increased as the lock housing 103** does not need to accommodate and support more than one hub.

Figure 2:
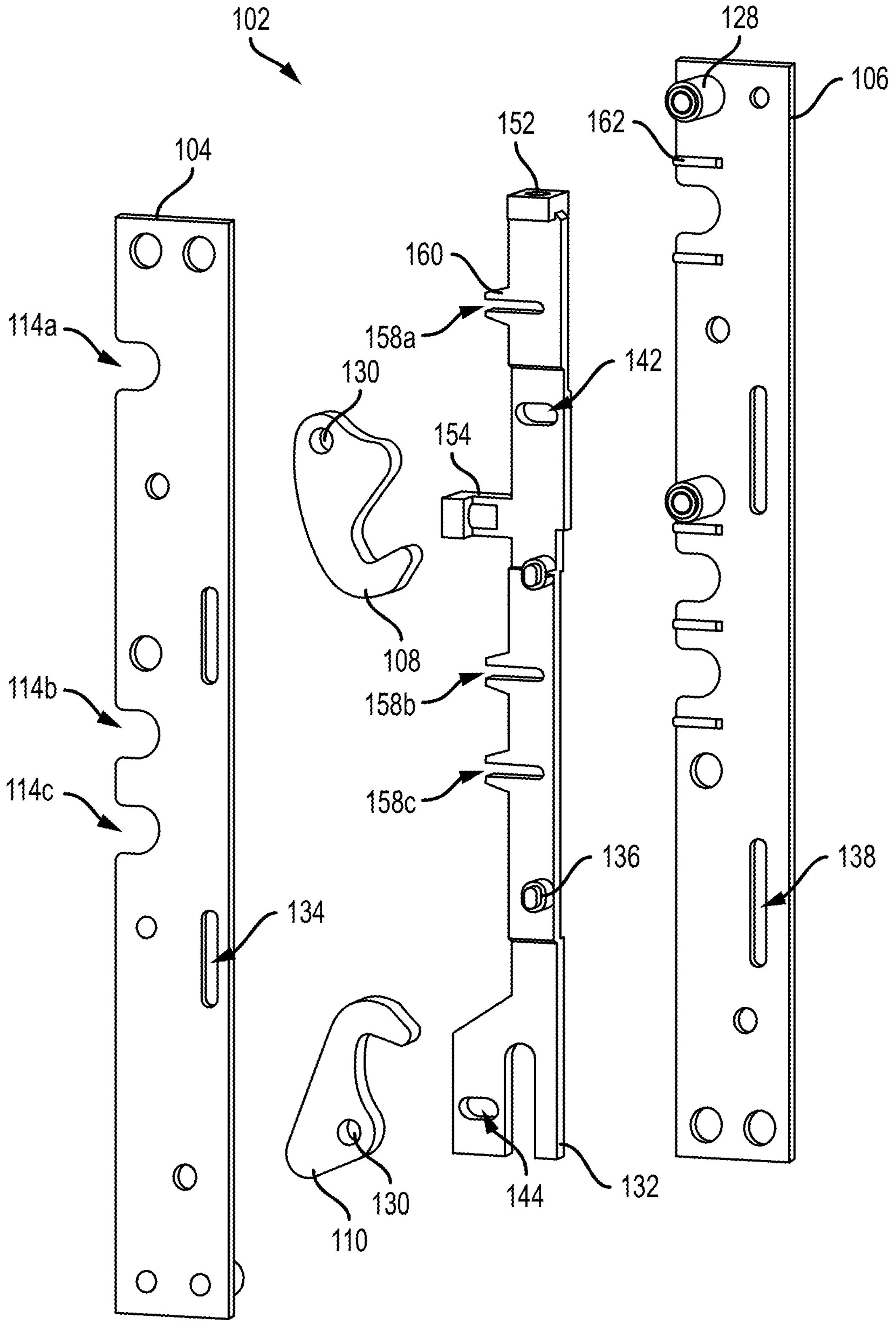
FIGS. 2 and 3 are exploded, perspective views of a lock assembly of the multi-point sliding door lock shown in FIG. 1.
Figure 3:
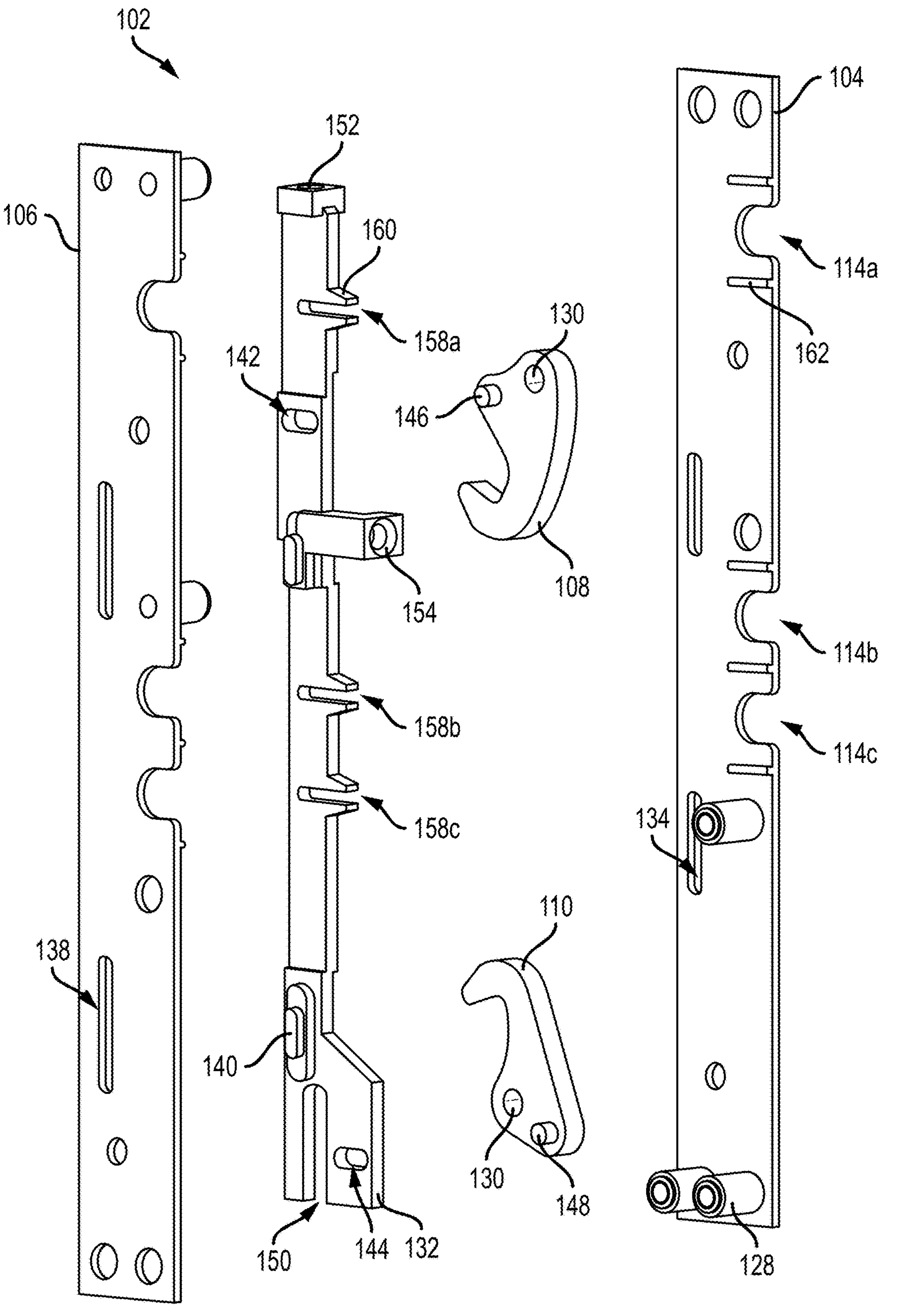

FIGS. 2 and 3 are exploded, perspective views of the lock assembly 102. The lock assembly 102 includes the first and second plates 104, 106 that couple together, and for example, via a fastener (not shown) and post 128 system at the ends 127, 129 and/or at any intermediate location. The first and second latch elements 108, 110 are pivotably coupled between the first and second plates 104, 106 at a pivot point 130. The pivot point 130 extends parallel to the transverse axis 115 (shown in FIG. 1) and, in the example, may be formed with a pin (not shown) that extends between the first and second plates 104, 106 and through an aperture defined in the latch elements 108, 110. The first and second latch elements 108, 110 pivotably move between the extended and retracted positions. A slide plate 132 is slidably mounted between the first and second plates 104, 106 and is coupled to the first and second latch elements 108, 110. The slide plate 132 is configured to slide along the longitudinal axis 124 (shown in FIG. 1) and within the lock housing 103 (shown in FIG. 1). Based on the sliding movement of the slide plate 132, the first and second latch elements 108, 110 are configured to selectively extend and retract from the lock housing 103.

The first plate 104 includes a pair of first elongated slots 134 proximate the locking face 112 (shown in FIG. 1) of the lock housing 103. The first elongated slots 134 are configured to receive corresponding first lugs 136 extending from a first side of the slide plate 132. Additionally, the second plate 106 includes a pair of second elongated slots 138 proximate the locking face 112 of the lock housing 103. The second elongated slots 138 are configured to receive corresponding second lugs 140 extending from a second side of the slide plate 132. The length of the slots 134, 138, relative to the lugs 136, 140, define the sliding distance of the slide plate 132 along the longitudinal axis 124. In the example, the sliding distance of the slide plate 132 is such that the distal ends of the slide plate 132 do not extend past the ends 127, 129 of the first and second plates 104, 106 when moving the latch elements 108, 110 between the extended and retracted positions.

The first lugs 136 extend from an opposite side of the second lugs 140 on the slide plate 132. The first lugs 136 may have a different length than the second lugs 140. The first elongated slots 134 also have a different length than the second elongated slots 138 because of the difference in the size of the first and second lugs 136, 140. The first slots 134 and lugs 136 are longitudinally offset from the second slots 138 and lugs 140 along the locking face 112 so as to facilitate the structural strength of the lock assembly 102.

The slide plate 132 defines a first transverse channel 142 and a second transverse channel 144 elongated along the transverse axis 115. The transverse channels 142, 144 are elongated in a transverse direction relative to the longitudinal axis 124. The first transverse channel 142 slidingly receives a first finger 146 extending from the first latch element 108. The second transverse channel 144 slidingly receives a second finger 148 extending from the second latch element 110. Because the first and second latch elements 108, 110 are pivotably mounted between the first and second plates 104, 106, when the slide plate 132 moves along the longitudinal axis 124, the engagement between the first and second latch elements 108, 110 and the slide plate 132 causes the first and second latch elements 108, 110 to pivot between the extended and retracted positions. In the example, the first and second transverse channel 142, 144 have a similar length so that the first and second latch elements 108, 110 have corresponding movements. The first transverse channel 142 may not be longitudinally aligned with the second transverse channel 144. As such, the first latch element 108 may have a different geometry and finger position than the second latch element 110. Said another way, the first latch element 108 has a different outer perimeter profile shape than the second latch element 110. This different configuration facilitates mounting the latch elements 108, 110 within the lock housing 103 while accommodating the other components therein.

In this example, the extension distance of the latch elements 108, 110 are not adjustable and because of the operation through the slide plate 132. In other examples, the pivotable coupling of the latch elements 108, 110 may include an adjustment mechanism configured to facilitate extension length adjustment of the latch elements 108, 110 individually and relative to the locking face 112 of the lock housing 103.

Adjacent the second transverse channel 144, a slit 150 may be defined in the slide plate 132 so that the pivot point 130 of the second latch element 110 can extend between the first and second plates 104, 106. In the example, the slit 150 at least partially surrounds the pivot point 130 of the second latch element 110 and on at least three sides.

The slide plate 132 may also include one or more remote latch couplers 152, 154. The couplers 152, 154 are fixed to the slide plate 132 and extend therefrom. The couplers 152, 154 are positioned proximate an outer perimeter of the lock assembly 102 and the first and second plates 104, 106. Because the first and second plates 104, 106 do not have a sidewall connecting them, the couplers 152, 154 are accessible from the exterior of the lock assembly 102. The couplers 152, 154 allow for remote latches (not shown) to be operationally coupled to the slide plate 132 via a link arm, drive arm, or the like. As such, movement of the slide plate 132 can drive operation of a remote latch positioned elsewhere on the door. The remote latch may be a shoot bolt such that the coupler 152 provides a direct linear drive. The remote latch may be another hook such that the coupler 154 can drive a rotational movement. It is appreciated, that while only two couplers 152, 154 are illustrated, one, three, or more, couplers may be provided and at any location on the slide plate 132 as required or desired. In the example, the couplers 152, 154 may defines an aperture to receive the link or drive arm from the remote lock. Because the slide plate 132 linearly slides within the lock assembly 102 via the cartridge assembly 116 (shown in FIG. 1), the slide plate 132 is better configured for driving operation of remote locks when compared to link arm actuators that at least partially pivot within the lock assembly.

In order to drive the sliding movement of the slide plate 132, the cartridge assembly 116 is used. The cartridge assembly 116 includes a pin 156 (shown in FIG. 4) supported by the hub 120 (shown in FIG. 1) that is received at one of a plurality of transverse grooves 158 defined in the slide plate 132. The transverse grooves 158 form a plurality of hub mounts spaced along the longitudinal axis 124 and correspond to the notches 114 of the first and second plates 104, 106. The transverse grooves 158 extend parallel to the transverse axis 115 and are open in a direction that faces towards the rear face 113 (shown in FIG. 1) of the lock housing 103. In the example, a length of the transverse grooves 158 are extended by a pair of fins 160. This elongated length of the transverse grooves 158 allow for the cartridge assembly 116 to operate the slide plate 132 in two or more backset positions while the pin 156 is engaged with the slide plate 132 and moveable therein. Upon rotation of the hub 120 of the cartridge assembly 116, the pin 156 rotates and drives the sliding movement of the slide plate 132 while also sliding within the transverse grooves 158 as described herein.

The transverse grooves 158 of the slide plate 132 define a plurality of hub mounts to engage with the hub 120 of the cartridge assembly 116. The rear face 113 of the lock housing 103 defines a corresponding number of cartridge mounts to engage with the cartridge housing 118 of the cartridge assembly 116. The cartridge assembly 116 can be coupled to any one of the hub mounts and cartridge mounts of the lock assembly 102 and drive operation of the multi-point sliding door lock 100 as described herein. In an example, the cartridge mounts can include the notches 114 and a transverse rib 162 above and below the notches 114. The transverse ribs 162 extend parallel to the transverse axis 115 and are disposed on the inside surface of the first and second plates 104, 106.

Figure 4:
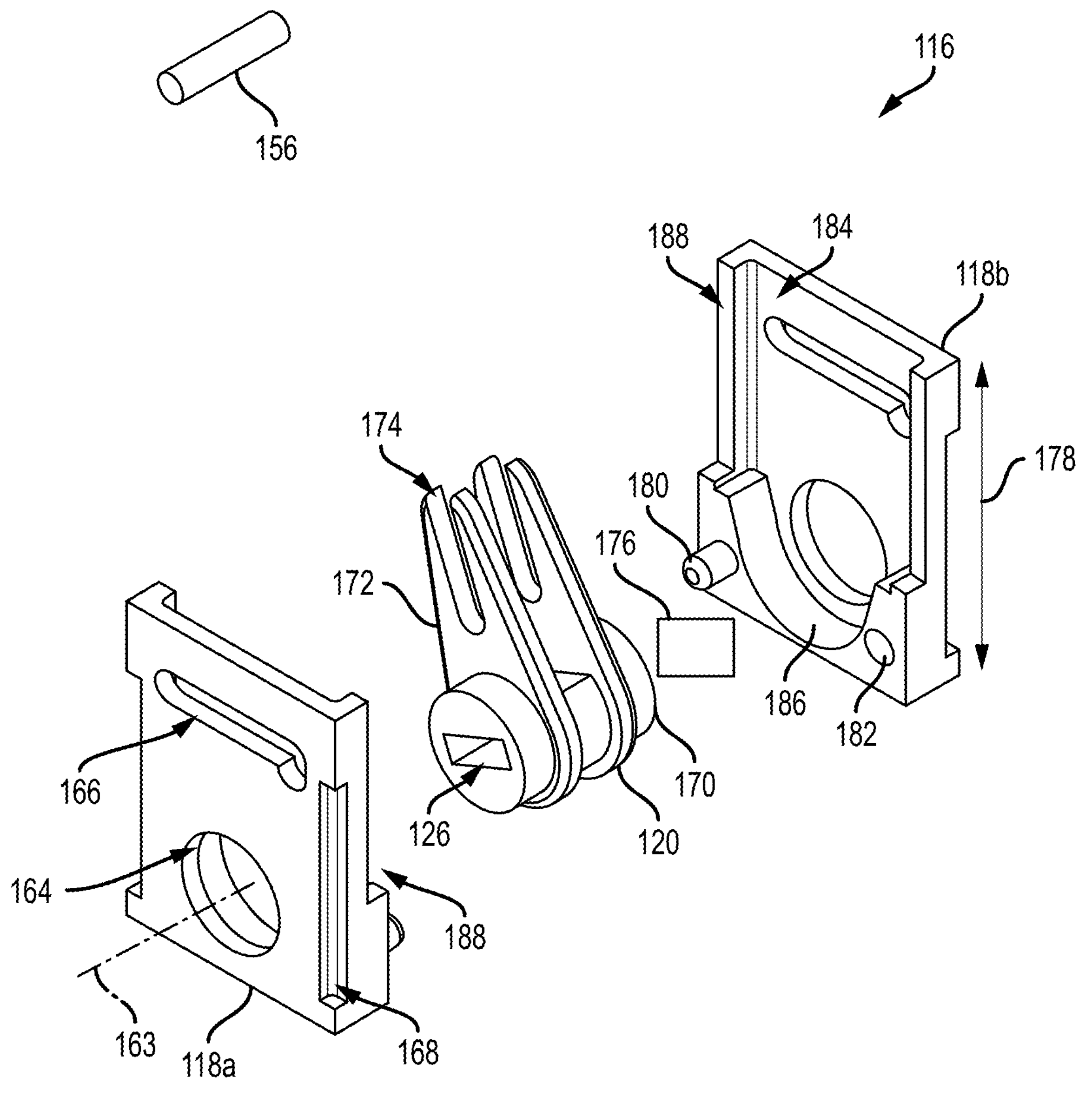
FIG. 4 is an exploded, perspective view of a cartridge assembly of the multi-point sliding door lock shown in FIG. 1.

FIG. 4 is an exploded, perspective view of the cartridge assembly 116. The cartridge assembly 116 includes a two-piece cartridge housing 118*a*, 118*b* that captures the hub 120 and the pin 156 therein. The cartridge housing 118 defines an opening 164 that a portion of the hub 120 rotationally mounts within. The opening 164 defines a rotational axis 163 that the hub 120 rotates around and the rotational axis 163 extends through the opening 126 that receives the torque blade from the attached handle assembly. The rotational axis 163 is orthogonal to both the transverse axis 115 and the longitudinal axis 124 (both shown in FIG. 1).

Additionally, a channel 166 is defined by the cartridge housing 118 and spaced apart from the opening 164. In the example, the channel 166 may have a L-shape with a long leg and a short leg. The pin 156 is received within the short leg when the latch elements 108, 110 (shown in FIGS. 2 and 3) are extended so that the latch elements 108, 110 are restricted from being pushed out of the extended position without rotation of the hub 120 via the torque blade. The hub 120 also includes a spring 176 (shown schematically). The spring 176 is configured to bias rotation of the hub 120 so that the pin 156 is pulled towards the short leg of the channel 166. In an aspect, the spring 176 may also bias rotation of the hub 120 such that when the pin 156 is not within the short leg, the pin 156 is pushed towards the distal end of the long leg away from the short leg and so that if the latch elements 108, 110 are between the extended and retracted positions, the latch elements 108, 110 automatically move towards the retracted position. Additionally, or alternatively, the slide plate 132 may have a biasing element as required or desired.

On the exterior of the cartridge housing 118, the edges define a gap bevel 168 that is shaped and sized to receive the transverse rib 162 (shown in FIGS. 2 and 3) of the lock housing 103 (shown in FIG. 1) so as to couple the cartridge assembly 116 to the lock assembly 102. In the example, the length of the transverse rib 162 is shorter than the length of the gap bevel 168 so that the cartridge housing 118 can be transversely positioned relative to the rear face 113 (shown in FIG. 1) of the lock housing 103 and adjust the backset distance of the hub 120. In examples, the plates 104, 106 (shown in FIGS. 2 and 3) are configured to allow the cartridge housing 118 to be coupled to the lock housing 103 in a snap fit connection and allow the position the cartridge assembly 116 to be adjusted relative to the lock assembly 102. In other examples, a screw (not shown) may be used to couple the cartridge assembly 116 to the lock assembly 102. Once the screw is fastened, the cartridge assembly 116 may not be able to further be slidably positioned relative to the lock assembly 102.

Generally, the cartridge assembly 116 is configured to be coupled to the lock assembly 102 during the installation process of the multi-point sliding door lock 100 on the door and to the handle assembly. In some examples, the cartridge assembly 116 may be removable from the lock assembly 102 so that the cartridge assembly 116 can be easily repositioned as required or desired. In still other examples, the cartridge assembly 116 once coupled to the lock assembly 102 may not be removable unless the lock assembly 102 is partially disassembled. This allows for the cartridge assembly 116 to be easily inserted into the lock assembly 102 at a required or desired position but makes the cartridge assembly 116 difficult to reposition. Additionally, the cartridge assembly 116 once coupled to the lock assembly 102 may be freely slidable into different backset positions or the cartridge mount of the lock assembly 102 may form two or more predefined backset positions that the cartridge assembly 116 can move between. In an example, a securement fastener (not shown) may be used to securely fix the cartridge assembly 116 relative to the lock assembly 102 once the required or desired backset position is determined.

The hub 120 includes a substantially cylindrical body 170 with the torque blade opening 126 defined therein. The cylindrical body 170 is configured to seat within the openings 164 of the cartridge housing 118 and be rotatable around the rotational axis 163. Additionally, a pair of arms 172 radially extend from the cylindrical body 170 and include a raceway 174 that receives the pin 156. The pin 156 is slidably received within the raceway 174 of the hub 120 and the channel 166 of the cartridge housing 118 with a middle portion of the pin 156 exposed and configured to be received by the slide plate 132 and the transverse grooves 158 (shown in FIGS. 2 and 3). This engagement of pin 156 facilitates transferring rotation of the hub 120 into transverse movement of the slide plate 132.

The two-piece cartridge housing 118*a*, 118*b* includes corresponding protrusions 180 and recesses 182 such that the two pieces can be coupled together and form the cartridge housing 118 with the hub 120 and the spring 176 captured therein and within an interior cavity 184. Within the interior cavity 184, the cartridge housing 118 may form an accurate shoulder 186 that rotationally supports the hub 120. Additionally, rotational movement of the hub 120 is defined by the channel 166. Each housing piece 118*a*, 118*b* includes a slit 188 defined adjacent the gap bevel 168. When the housing pieces 118*a*, 118*b* are coupled together a slit opening is formed on the side of the cartridge housing 118. This slit opening allows for the arms 172 of the hub 120 to rotate through a larger angular range than if fully enclosed within the cartridge housing 118. In an aspect, the arms 172 may not pivot outside of the cartridge housing 118. In another aspect, the arms 172 may pivot about 90° within the cartridge housing 118. In still another aspect, the arms 172 may pivot about 60° within the cartridge housing 118.

Figure 5:
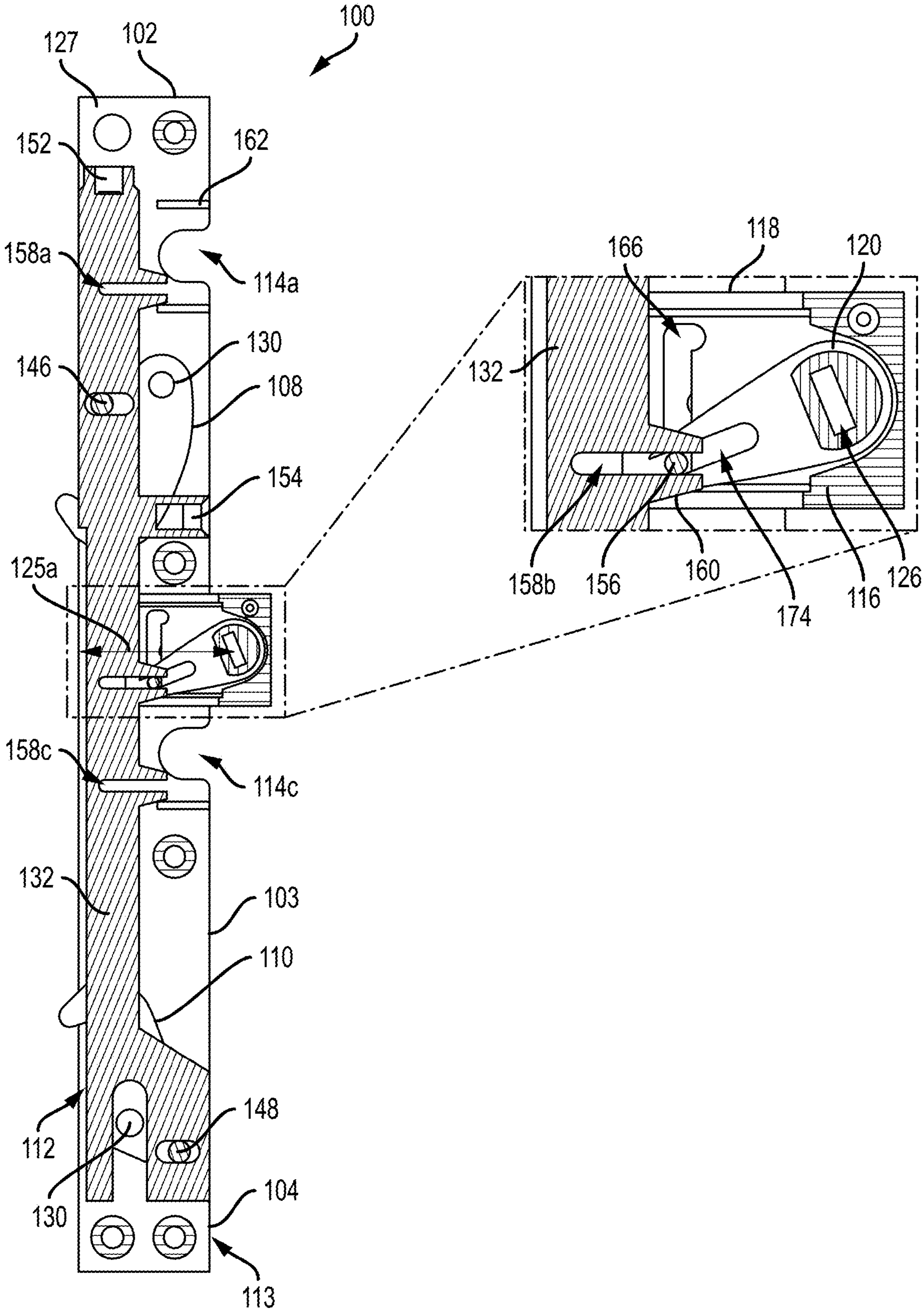
FIG. 5 is a cross-sectional view of the multi-point sliding door lock shown in FIG. 1.
Figure 6:
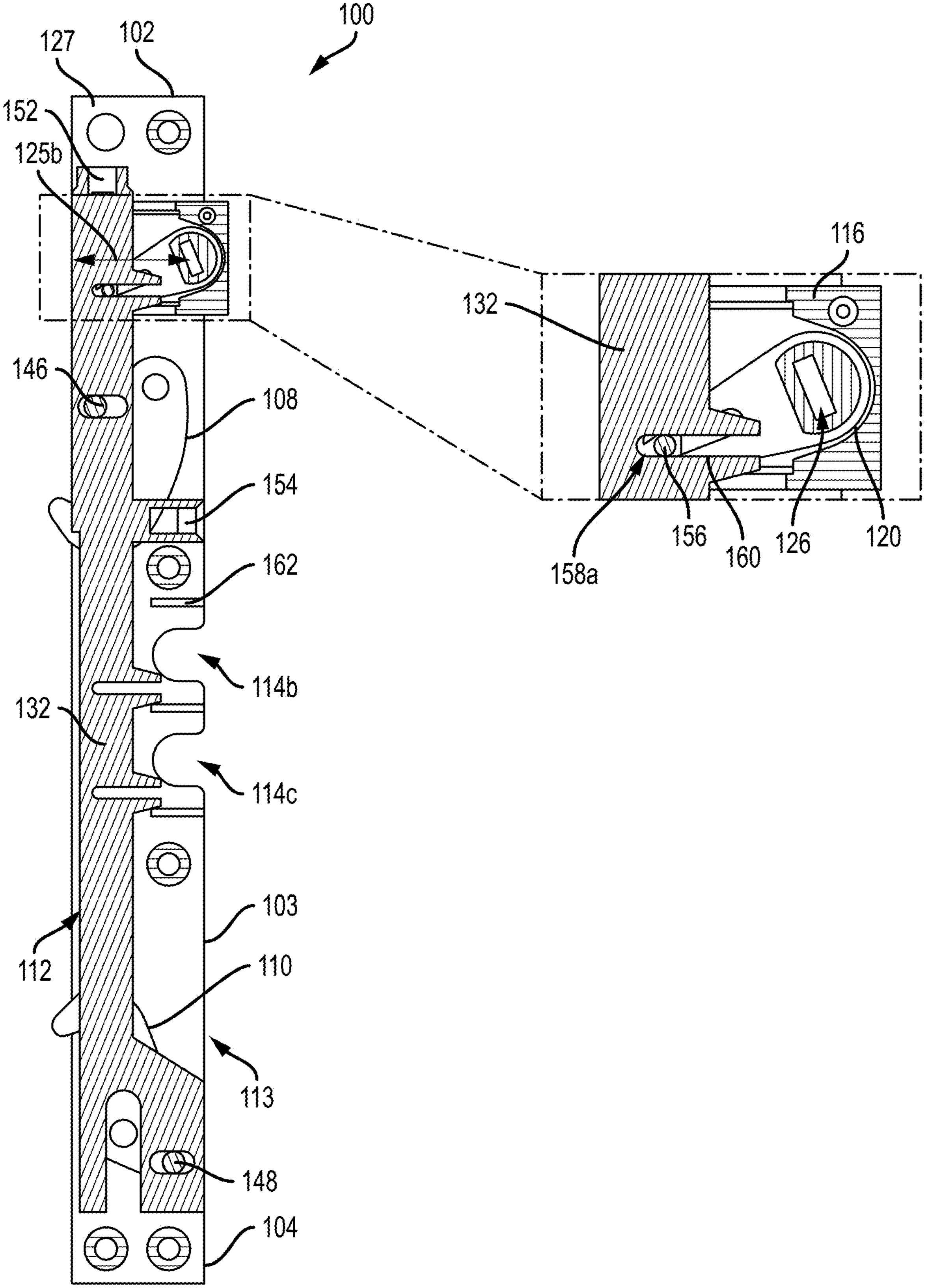
FIG. 6 is another cross-sectional view of the multi-point sliding door lock shown in FIG. 1.

The cartridge housing 118 has a length 178 that is configured to capture the hub 120 within and allow it to at least partially rotate therein. Additionally, the length 178 allows the cartridge housing 118 to slide relative to the lock assembly 102 and the hub 120 to be positioned at different backset positions and as illustrated in FIGS. 5 and 6 described below. As such, a single cartridge assembly 116 is used with the lock assembly 102. In other examples, the cartridge assembly 116 may have housings with different lengths 178 to accommodate different backset positions for the hub 120. For example, a shorter housing length for smaller backset positions and a longer housing length for deeper backset positions. This configuration enables the cartridge housing 118 to couple to the lock assembly 102 without needing to slide and the cartridge assembly 116 to be selected for the required or desired backset. The length of the hub 120 may change or may stay the same with the different length housings. In still other examples, the hub 120 may be configured to slide within the cartridge housing 118 so as to accommodate different backset positions and with the cartridge housing 118 having a set length 178 and set position relative to the lock assembly 102.

FIG. 5 is a cross-sectional view of the multi-point sliding door lock 100. Certain components are described above and are not necessarily described further. The cartridge assembly 116 is received by the lock assembly 102 such that the pin 156 is received within the transverse groove 158*b*. The pin 156 is captured between the channel 166 of the cartridge housing 118, the raceway 174 of the hub 120, and the transverse groove 158*b* and slidable within each. As such, rotation of the hub 120 drives movement of the slide plate 132 from engagement with the transverse groove 158*b*. The other transverse grooves 158*a*, 158*c* are left disengaged.

Additionally, the cartridge assembly 116 is extended outwards from the lock assembly 102 such that a larger backset distance 125*a* is set relative to the locking face 112. With the cartridge assembly 116 being further extended from the rear face 113 than the illustration of FIG. 6, the fins 160 at least partially surrounding the transverse grooves 158 enable the pin 156 to be engaged with the slide plate 132. When the cartridge assembly 116 is in the larger backset distance 125*a*, the hub 120 and the opening 126 may be disposed completely out of the corresponding notch 114. In another aspect, when the cartridge assembly 116 is in the larger backset distance 125*a*, the hub 120 may substantially be disposed out of the corresponding notch 114 while the opening 126 is completely out of the notch 114 and rearward of the rear face 113.

As illustrated in FIG. 5, the latch elements 108, 110 are in the retracted position. In the retracted position, the pin 156 is within the long leg of the L-shaped channel 166 of the cartridge housing 118. The spring 176 may bias the pin 156 towards this positional configuration. In an aspect, one of the arms of the hub 120 may be disposed within the slit opening of the cartridge housing 118 as described above. Upon rotation of the hub 120 (e.g., in a clockwise direction around the rotational axis), the slide plate 132 will move towards the first end 127 of the lock housing 103 and the pin 156 slides towards the short leg of the L-shaped channel 166. Once the pin 156 is in the short leg, the extended position of the latch elements 108, 110 are maintained until reverse rotation of the hub 120 by the torque blade.

FIG. 6 is another cross-sectional view of the multi-point sliding door lock 100. Certain components are described above and are not necessarily described further. In this example, the cartridge assembly 116 is received by the lock assembly 102 such that the pin 156 is received within the transverse groove 158*a*. As such, rotation of the hub 120 drives movement of the slide plate 132 from a different location than what is illustrated in FIG. 5, however, the sliding operation of the slide plate 132 and the corresponding latch elements 108, 110 remains the same. FIG. 6 also illustrates the latch elements 108, 110 in the retracted position.

Additionally, the cartridge assembly 116 is positioned in a less extended position and inwards towards the lock assembly 102 such that a smaller backset distance 125*b* is set relative to the locking face 112 of the lock housing 103. With the cartridge assembly 116 being closer to the rear face 113 than the illustration of FIG. 5, the fins 160 are not necessary to enable the pin 156 to be engaged with the slide plate 132, however, the fins 160 are still present for when a different backset distance is utilized. When the cartridge assembly 116 is in the smaller backset distance 125*b*, the hub 120 and the opening 126 may be disposed completely within the corresponding notch 114. In another aspect, when the cartridge assembly 116 is in the smaller backset distance 125*b*, the hub 120 may substantially be disposed within the corresponding notch 114 while the opening 126 is completely within the notch 114 and forward of the rear face 113.

In some examples, the lock assembly 102 may include a face plate (not shown) and for mounting the multi-point sliding door lock 100 within the sliding door. In this example, the face plate couples to the locking face 112 of the first and second plates 104, 106 and forms the front face itself.

Figure 7:
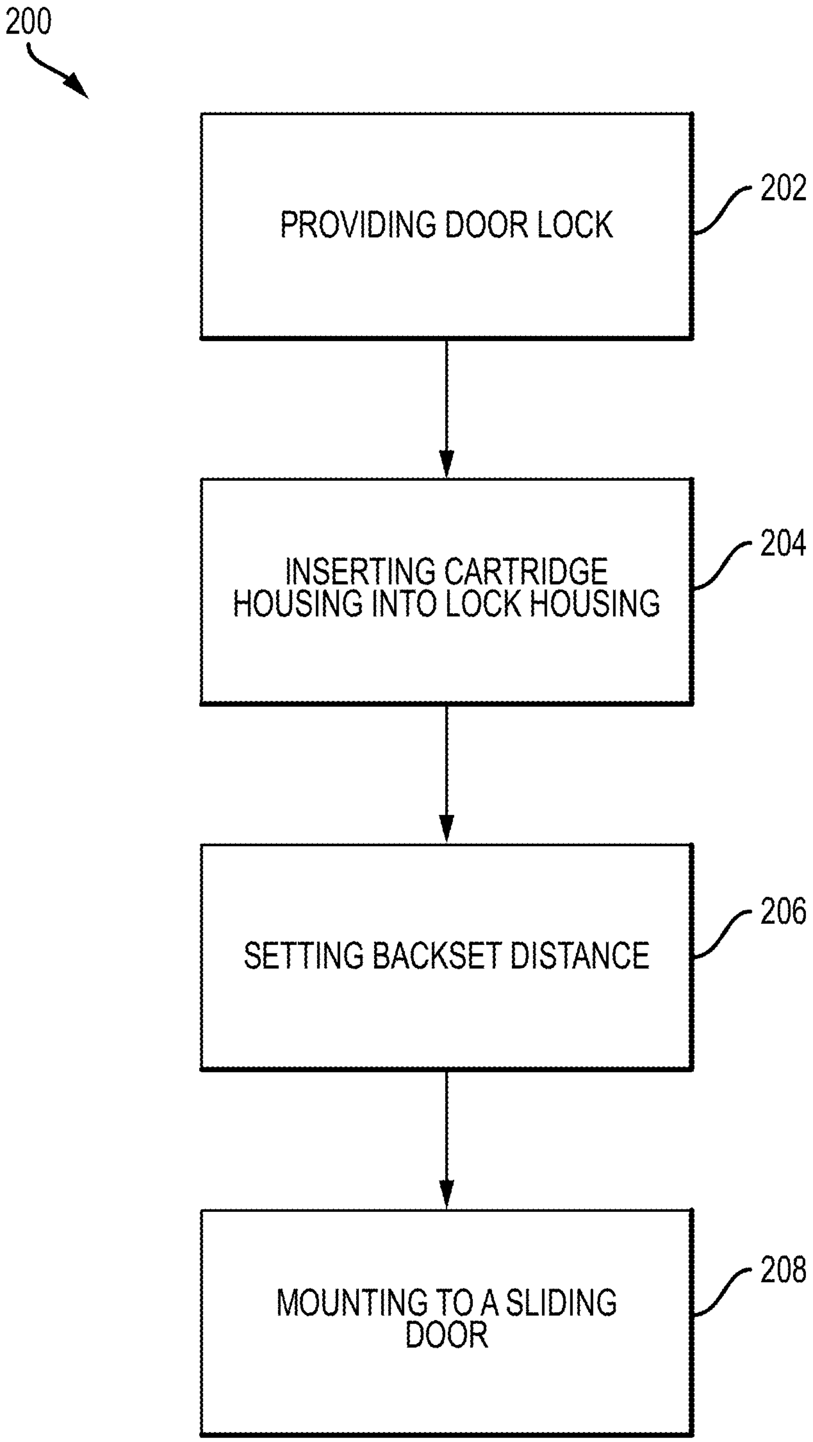
FIG. 7 is a flowchart illustrating a method of installing a multi-point sliding door lock.

FIG. 7 is a flowchart illustrating a method 200 of installing a multi-point sliding door lock. The multi-point sliding door lock may be the same or similar to the multi-point sliding door lock 100 described above in reference to FIGS. 1-6. The method begins with providing the multi-point sliding door lock (operation 202). The multi-point sliding door lock includes a lock assembly with a lock housing elongated along a longitudinal axis. The lock housing has a locking face and a rear face, the locking face and the rear face are opposite one another relative to a transverse axis that is orthogonal to the longitudinal axis. A pair of latch elements are pivotally coupled to the lock housing, and each of the pair of latch elements are configured to move between an extended position relative to the locking face and a retracted position. A slide plate is disposed within the lock housing and slidable along the longitudinal axis. The slide plate is engaged with the pair of latch elements such that sliding movement of the slide plate moves each of the pair of latch elements between the extended position and the retracted position. The multi-point sliding door lock also includes a cartridge assembly with a cartridge housing and a hub rotatably mounted at least partially within the cartridge housing and defining an opening configured to receive a torque blade. The hub is configured to engage with the slide plate when the cartridge assembly is received by the lock assembly such that rotation of the hub drives the sliding movement of the slide plate.

The cartridge housing is inserted at least partially into the lock housing at one of a plurality of different positions spaced along the longitudinal axis (operation 204). The cartridge housing is inserted from the rear face of the lock housing and in a direction parallel to the transverse axis. A backset distance of the opening of the hub is set relative to the locking face of the lock housing (operation 206). In an example, the cartridge housing is selectively positioned along the transverse axis and relative to the lock housing. In some examples, the backset distance may be secured by a fastener or other securement element or assembly so as to fix the backset distance of the opening. In other examples, the lock assembly may define two or more different backset distance so that the cartridge housing is coupled to and fixed to the lock assembly at a predefined backset distance. In still other examples, the hub may be positioned within the cartridge housing to set the backset position. In yet other examples, the cartridge housing may be selected from two or more different lengths so as to set the backset position. The lock assembly with the cartridge assembly attached thereto may then be mounted to a sliding door (operation 208). Once the door lock is mounted to the sliding door, the handle assembly may be coupled to the hub of the cartridge assembly via the torque blade and the opening of the hub.

The multi-point sliding door lock assembly described above facilitates a multi-point lock to be selectively configured for a wider range of handle assemblies. The multi-point sliding door lock assembly includes a lock assembly housing a plurality of latching elements and a cartridge assembly that can selectively couple to the lock assembly for operation of the latching elements. The lock assembly defines three or more cartridge mounting positions for receiving the cartridge assembly. The position that the cartridge assembly is mounted within is based on the handle assembly being used with the multi-point lock. The cartridge assembly can be mounted to the lock assembly based on left- or right-handed handle assembly configuration. The cartridge assembly can also be mounted to the lock assembly based on if the handle assembly will be mounted above or below the latching elements and for example with recessed handle assemblies.

Additionally, the cartridge assembly is configured to receive the actuator (e.g., torque blade) from the handle assembly. The cartridge assembly can be mounted relative to the lock assembly at two or more different backset positions at each cartridge mounting position. By being able to adjust the backset position on a multi-point lock, a wider variety of handle assembly configurations are facilitated.

The materials utilized in the manufacture of the multi-point sliding door lock described herein may be those typically utilized for door hardware, e.g., zinc, steel, aluminum, brass, stainless steel, etc. Molded plastics, such as PVC, polyethylene, etc., may be utilized for the various components. Material selection for most of the components may be based on the proposed use of the sliding door. Appropriate materials may be selected for components used on particularly heavy panels, as well as on components subject to certain environmental conditions (e.g., moisture, corrosive atmospheres, etc.).

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A multi-point sliding door lock comprising:

a lock assembly including:

a lock housing elongated along a longitudinal axis, the lock housing having a locking face and a rear face, the locking face and the rear face opposite one another relative to a transverse axis that is orthogonal to the longitudinal axis;

a pair of latch elements pivotally coupled to the lock housing, each of the pair of latch elements configured to move between an extended position relative to the locking face and a retracted position; and a slide plate disposed within the lock housing and slidable along the longitudinal axis, the slide plate engaged with the pair of latch elements such that sliding movement of the slide plate moves each of the pair of latch elements between the extended position and the retracted position; and a cartridge assembly including:

a cartridge housing insertable at least partially into the lock housing from the rear face in a direction parallel to the transverse axis, the lock assembly configured to receive the cartridge assembly in a plurality of different positions spaced along the longitudinal axis; and a hub rotatably mounted at least partially within the cartridge housing and defining an opening configured to receive a torque blade, wherein the hub engages with the slide plate when the cartridge assembly is received by the lock assembly such that rotation of the hub drives the sliding movement of the slide plate, and wherein the slide plate defines a plurality of hub mounts spaced along the longitudinal axis and facing towards the rear face of the lock housing, each of the plurality of hub mounts configured to engage with the hub of the cartridge assembly.

2. The multi-point sliding door lock of claim 1, wherein the plurality of hub mounts are transverse grooves defined by the slide plate and parallel to the transverse axis.

3. The multi-point sliding door lock of claim 2, wherein the transverse grooves are at least partially defined by a pair of fins extending from the slide plate.

4. The multi-point sliding door lock of claim 2, wherein the hub includes at least one arm, the at least one arm and the cartridge housing supporting a pin, and wherein the pin is configured to engage at least partially within the respective transverse groove of the slide plate.

5. The multi-point sliding door lock of claim 4, wherein the cartridge housing defines at least one L-shaped channel that at least partially slidingly receives the pin, the at least one L-shaped channel defining a locked position for the pin.

6. The multi-point sliding door lock of claim 1, wherein the slide plate further includes one or more couplers for attaching a remote lock.

7. The multi-point sliding door lock of claim 1, wherein at each of the plurality of different positions that the cartridge housing is received by the lock housing, the opening of the hub is selectively positionable along the transverse axis between at least two different backset positions relative to the locking face of the lock housing.

8. The multi-point sliding door lock of claim 1, wherein at each of the plurality of different positions that the cartridge housing is received by the lock housing, the lock housing includes at least one transverse rib adapted to engage with at least a portion of the cartridge housing.

9. The multi-point sliding door lock of claim 8, wherein the cartridge housing defines at least one gap bevel configured to slidingly engage the at least one transverse rib.

10. A multi-point sliding door lock comprising:

a lock assembly including:

a lock housing elongated along a longitudinal axis, the lock housing having a locking face and a rear face, the locking face and the rear face opposite one another relative to a transverse axis that is orthogonal to the longitudinal axis;

a pair of latch elements pivotally coupled to the lock housing, each of the pair of latch elements configured to move between an extended position relative to the locking face and a retracted position; and a slide plate disposed within the lock housing and slidable along the longitudinal axis, the slide plate engaged with the pair of latch elements such that sliding movement of the slide plate moves each of the pair of latch elements between the extended position and the retracted position, wherein the slide plate includes a plurality of transverse grooves spaced along the longitudinal axis and open relative to the rear face; and a cartridge assembly including:

a cartridge housing insertable at least partially into the lock housing from the rear face in a direction parallel to the transverse axis, the lock assembly configured to receive the cartridge assembly in a plurality of different positions corresponding to the plurality of transverse grooves;

a hub rotatably mounted at least partially within the cartridge housing and defining an opening configured to receive a torque blade, the hub includes at least one radially extending arm; and a pin supported by the at least one radially extending arm and the cartridge housing, wherein the pin engages with one of the plurality of transverse grooves when the cartridge assembly is received by the lock assembly such that rotation of the hub drives the sliding movement of the slide plate.

11. The multi-point sliding door lock of claim 10, wherein the rear face of the lock housing includes a plurality of cartridge mounts spaced along the longitudinal axis, each of the plurality of cartridge mounts configured to engage with the cartridge housing of the cartridge assembly.

12. The multi-point sliding door lock of claim 11, wherein each of the plurality of cartridge mounts includes a notch extending from the rear face, the notch configured to at least partially receive the hub of the cartridge assembly.

13. The multi-point sliding door lock of claim 12, wherein at each of the plurality of cartridge mounts that the cartridge housing is received by the lock housing, the opening of the hub is selectively positionable along the transverse axis between at least two different backset positions relative to the locking face of the lock housing, and wherein in a first backset position, the opening of the hub is at least partially received within the notch, and in a different second backset position, the opening of the hub is outside of the notch.

14. The multi-point sliding door lock of claim 12, wherein the notch is bounded on each longitudinal side by a transverse rib.

15. The multi-point sliding door lock of claim 10, wherein the cartridge housing defines at least one L-shaped channel that at least partially slidingly receives the pin, the at least one L-shaped channel defining a locked position for the pin.

16. The multi-point sliding door lock of claim 10, wherein the slide plate further includes one or more couplers for attaching a remote lock.

17. The multi-point sliding door lock of claim 10, wherein the slide plate defines a longitudinal slit, the longitudinal slit at least partially surrounding a pivot point of one of the pair of latch elements.

18. The multi-point sliding door lock of claim 10, wherein each of the pair of latch elements have a different outer perimeter profile shape.

19. A method of installing a multi-point sliding door lock comprising:

providing the multi-point sliding door lock that includes a lock assembly with a lock housing elongated along a longitudinal axis, the lock housing having a locking face and a rear face, the locking face and the rear face opposite one another relative to a transverse axis that is orthogonal to the longitudinal axis, a pair of latch elements pivotally coupled to the lock housing, each of the pair of latch elements configured to move between an extended position relative to the locking face and a retracted position, and a slide plate disposed within the lock housing and slidable along the longitudinal axis, the slide plate engaged with the pair of latch elements such that sliding movement of the slide plate moves each of the pair of latch elements between the extended position and the retracted position, the multi-point sliding door lock also includes a cartridge assembly with a cartridge housing and a hub rotatably mounted at least partially within the cartridge housing and defining an opening configured to receive a torque blade, wherein the hub engages with the slide plate when the cartridge assembly is received by the lock assembly such that rotation of the hub drives the sliding movement of the slide plate, and wherein the slide plate defines a plurality of hub mounts spaced along the longitudinal axis and facing towards the rear face of the lock housing, each of the plurality of hub mounts configured to engage with the hub of the cartridge assembly;

inserting the cartridge housing at least partially into the lock housing at one of the plurality of hub mounts, wherein the cartridge housing is inserted from the rear face of the lock housing and in a direction parallel to the transverse axis;

setting a backset distance of the opening of the hub relative to the locking face of the lock housing by selectively positioning the cartridge housing along the transverse axis and relative to the lock housing; and mounting the lock assembly with the cartridge assembly attached thereto to a sliding door.

* * * * *